May 26, 1931.  C. A. HOXIE  1,807,409
SOUND RECORDING APPARATUS
Filed June 25, 1929

Inventor
Charles A. Hoxie,
by Charles E. Tullar
His Attorney.

Patented May 26, 1931

1,807,409

UNITED STATES PATENT OFFICE

CHARLES A. HOXIE, OF ALPLAUS, NEW YORK, ASSIGNOR TO GENERAL ELECTRIC COMPANY, A CORPORATION OF NEW YORK

SOUND RECORDING APPARATUS

Application filed June 25, 1929. Serial No. 373,664.

My invention relates to apparatus for photographically recording sound on a film and an object of my invention is the provision of improved apparatus of this character provided with means by which the film exposing light may be measured or compared with a reference light.

My invention will be better understood from the following description taken in connection with the accompanying drawings, and its scope will be pointed out in the appended claims.

Figure 1:
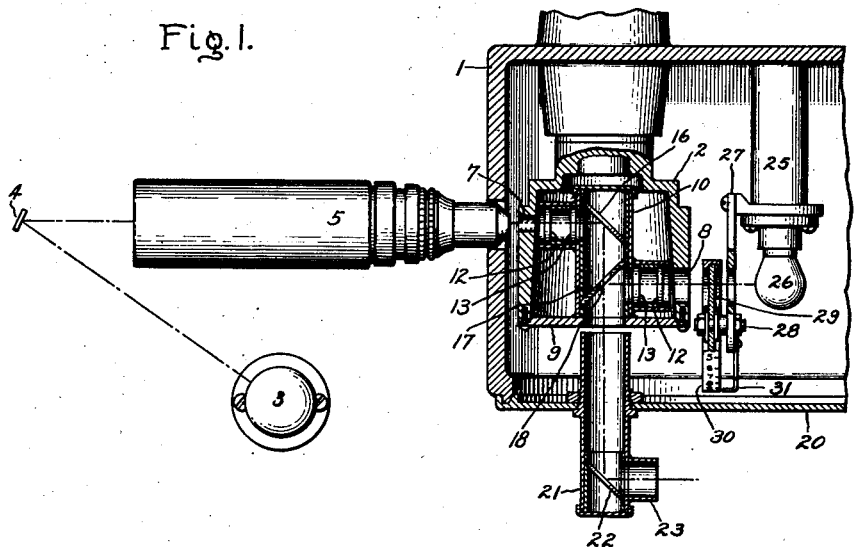
Figure 2:
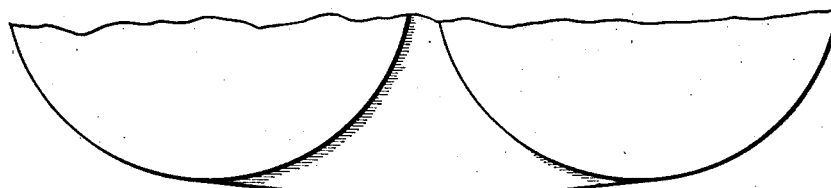
Figure 3:
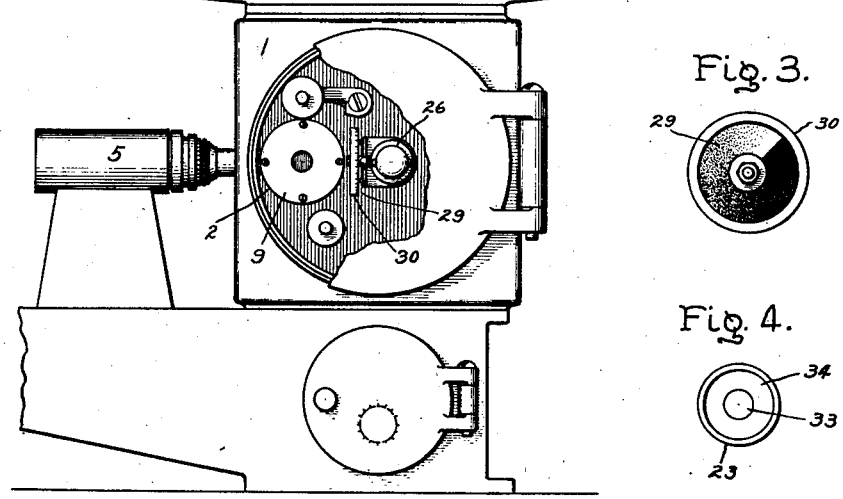
Figure 4:
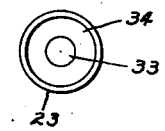

Referring to the drawings, Fig. 1 is a horizontal cross sectional view of an embodiment of my invention; Fig. 2 is a side elevation of the same drawn to smaller scale; Fig. 3 is a view of the screen of variable transparency forming a part of the apparatus and Fig. 4 illustrates how the two light sources appear to the observer when viewed through the apparatus.

In the drawing, the casing 1 encloses the film reels and the mechanism for moving the film at a uniform speed. This mechanism comprises in part the rotatable drum 2 which supports the film, not shown, at the point at which it is exposed to the light beam. In the form of apparatus which I have illustrated, a beam of light from the lamp 3 is vibrated by the oscillograph mirror 4 in accordance with the sound waves to be recorded and by suitable optical means 5 is focused to a line of light on the film having a width of the order of one one-thousandth of an inch. The drum 2 is provided with the aperture 7 which will aline with the optical system 5 and is shown at the opposite side provided with the larger aperture 8. The drum has the end head 9 shown attached thereto by small screws to which is secured the tube 10 having one branch extending toward the aperture 7 and another branch extending toward the aperture 8. In each branch near its outer end is a screen comprising a piece of ground glass 12 and adjacent it I have shown another diffusing screen comprising a piece of opal glass 13. Mounted in the tube 10 at an angle of 45° and opposite aperture 7 is the mirror 16. Opposite the aperture 8 a second mirror 17 is mounted in the tube also at an angle of 45° but at right angles to the first mentioned mirror. Mirror 17 has the transparent central portion 18 through which light reflected by the mirror 16 may pass to the observer without interruption. If the mirror 17 is a silvered glass plate the silver simply may be removed in the center to give the desired result. Attached to the cover 20 of the casing I have shown the tube 21 alining with the tube 10 and having at the outer end the mirror 22 in front of the branch 23. On a suitable support 25 is the reference lamp 26 with which the exposing lamp 3 is to be compared. Bracket 27 attached to support 25 has the pivot pin 28 on which is rotatably mounted the circular screen 29. This screen as shown in Fig. 3 has a varying transparency, the variation occurring circumferentially so that when placed between the lamp 26 and the opening 8 the amount of light transmitted into the drum may be varied by rotating the screen on its pivotal center. On the external band 30 of the screen I have shown graduations with which cooperate the pointer 31. With this construction a person looking into the branch 23 of tube 21 sees two adjacent fields of light, the circle 33 which comes from exposing lamp 3 and the surrounding ring 34 which comes from the reference lamp 26 modified by the screen 29. The color of the light from the two sources should be the same and the screen 29 should not change the color of the light coming from the reference lamp, thereby facilitating the comparison of the brightness of the two fields.

When a record is to be made the lamp 26 which is of standard power is first illuminated and the variable screen is adjusted to the point which has been found to be correct for the particular recording conditions prevailing, such as film sensitivity, length of development desired, etc., or which may be indicated on a table of directions for using the apparatus. While the operator looks into the branch 23 of the tube 21 he varies the brilliancy of the exposing lamp 3 until the two areas 33 and 34 appear equally bright. Reference lamp 26 may then be turned off and the film passed through the machine for making the sound record.

I have chosen the particular embodiment described above as illustrative of my invention and it will be apparent that various modifications may be made without departing from the spirit and scope of my invention which modifications I aim to cover by the appended claims.

What I claim as new and desire to secure by Letters Patent of the United States, is:

1. Sound recording apparatus comprising a drum adapted to support a sensitive film, a recording lamp arranged to direct a light beam on said film, said drum having an opening therein through which said beam may pass, a tubular member within the drum having an observation opening, means for reflecting the light of said beam after passing through said opening through said tubular member, a reference lamp, and means in said tubular member for restricting the light observed from one of said lamps to a circular area and the light observed from the other lamp to a ring surrounding said circular area.

2. Sound recording apparatus comprising a rotatable drum adapted to support a sensitive film, a recording lamp, means for focusing light therefrom into a narrow beam on a film on said drum, a tubular member arranged in the drum axially thereof, said drum having an opening through which said beam may pass, a mirror in the tubular member for reflecting said beam longitudinally thereof, a reference lamp, and a second mirror in said tubular member arranged in the path of the light from both of said lamps and having means to provide two adjacent fields illuminated by light respectively from said reference lamp and from said narrow beam.

3. In a sound recording apparatus having a film supporting drum provided with a light opening, a recording lamp arranged to direct a light beam on said drum, a second lamp, a photometric device arranged in said drum and comprising a mirror for reflecting light received through said opening from said recording lamp, a mirror arranged adjacent the reflected light from said first mirror for reflecting light from said second lamp, and a rotatable screen having circumferentially variable transparency arranged in the path of light from said second lamp.

4. A sound recording apparatus comprising a rotatable drum adapted to support a film and having a light opening therein, means for directing a sound controlled light beam toward the drum, a reference lamp mounted exteriorily of the drum and a photometric device mounted in the drum comprising a tube extending axially of the drum, a mirror therein arranged to receive light through said opening and to reflect it longitudinally of the tube, and a second mirror in the tube arranged to reflect longitudinally of the tube a light beam from said lamp whereby the two reflected light beams may be compared.

5. A sound recording apparatus comprising a rotatable drum adapted to support a film and having a light opening therein, means for directing a sound controlled light beam toward the drum, a reference lamp mounted exteriorily of the drum, and a photometric device mounted in the drum comprising a tube extending axially of the drum, a mirror therein arranged to receive light through said opening and reflect it longitudinally of the tube, a second mirror having a transparent central portion arranged in the path of light reflected from said first mirror for reflecting light from said lamp, and a rotatable screen having circumferentially varying transparency arranged in the path of light from said lamp.

In witness whereof, I have hereunto set my hand this 24th day of June, 1929.

CHARLES A. HOXIE.